(12) United States Patent
Bruecken

(10) Patent No.: US 7,725,481 B2
(45) Date of Patent: *May 25, 2010

(54) RETRIEVING AND PROVIDING CONTEXTUAL INFORMATION

(75) Inventor: Carl Bruecken, Leesburg, VA (US)

(73) Assignee: AOL Inc., Dulles, VA (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/041,345

(22) Filed: Mar. 3, 2008

(65) Prior Publication Data

US 2008/0154582 A1  Jun. 26, 2008

Related U.S. Application Data

(63) Continuation of application No. 11/261,923, filed on Oct. 31, 2005, now Pat. No. 7,340,470, which is a continuation of application No. 09/964,453, filed on Sep. 28, 2001, now Pat. No. 6,961,722.

(51) Int. Cl.
*G06F 17/30* (2006.01)
(52) U.S. Cl. .................... 707/758; 704/10; 715/532
(58) Field of Classification Search ............... 707/3, 707/6, 9, 10; 715/532; 709/203, 219; 704/10
See application file for complete search history.

(56) References Cited

U.S. PATENT DOCUMENTS

| 5,418,957 A | 5/1995 | Narayan |
| 5,642,522 A | 6/1997 | Zaenen et al. |
| 5,820,386 A | 10/1998 | Sheppard, II |
| 5,845,306 A | 12/1998 | Schabes et al. |
| 5,970,492 A | 10/1999 | Nielsen |
| 6,085,204 A | 7/2000 | Chijiwa et al. |
| 6,091,415 A | 7/2000 | Chang et al. |
| 6,151,598 A | 11/2000 | Shaw et al. |
| 6,351,771 B1 | 2/2002 | Craddock et al. |
| 6,363,348 B1 | 3/2002 | Besling et al. |
| 6,418,448 B1 * | 7/2002 | Sarkar ................ 707/104.1 |
| 6,708,311 B1 * | 3/2004 | Berstis ................ 715/206 |
| 6,782,510 B1 | 8/2004 | Gross et al. |
| 7,058,944 B1 * | 6/2006 | Sponheim et al. ........ 718/100 |
| 2002/0049705 A1 | 4/2002 | Haviv-Segal et al. |

* cited by examiner

*Primary Examiner*—Leslie Wong
(74) *Attorney, Agent, or Firm*—Fish & Richardson P.C.

(57) ABSTRACT

An electronic dictionary may be created by receiving a data request action for a word appearing in an electronic document, accessing information regarding the context of the word derived from within the electronic document in which the word appears, storing the definition of the word along with the context information for the word, and enabling access by the user to the definition and the context information.

20 Claims, 5 Drawing Sheets

RETRIEVING AND PROVIDING CONTEXTUAL INFORMATION

CROSS-REFERENCE TO RELATED APPLICATIONS

This application is a continuation of U.S. application Ser. No. 11/261,923, filed Oct. 31, 2005, which is a continuation of U.S. application Ser. No. 09/964,453, filed Sep. 28, 2001, the entire contents of both are incorporated by reference herein in their entirety.

TECHNICAL FIELD

The present invention relates generally to electronic dictionaries.

BACKGROUND

The paper-bound dictionary has been the traditional resource for use in identifying the meaning of words. Recently, with the emergence of electronic media, the functionality of paper bound dictionaries has been made available on computers.

SUMMARY

In one general aspect, an electronic dictionary may be created by receiving a data request action for a word, accessing context information derived from electronic documentation in which the word appears, storing the definition of the word along with the context information, and enabling a computer user to access the definition of the word and the context information.

Implementations may include one or more of the following features. For example, context information may include one or more words appearing around the word whose definition is sought, at least one of which is adjacent to the word whose definition is sought. Access to the definition and context information for one or more other words may be enabled. Access to context information from more than one electronic document may be enabled. Other implementations may include a selectable level of detail.

Implementations also may include identifying a target community appropriate for a party inputting the data request action and selecting the definition from multiple definitions available based on the target community identified. Identifying the target community may be based on the identification of the party and may be used to select one or more definitions for display. The identification may be determined by an Internet Protocol address, a screen name, or a profile of the party.

The definition and context information may be stored to enable mobile access and access by a computer user other than the computer user responsible for generating the data request action. Access to definitions and context information by more than one related entity may be enabled.

In another general aspect, an electronic dictionary may include definitions for one or more words identified from within an electronic document that is distinct from the electronic dictionary and context information for the word from within the electronic document. The context information may include at least one word that is positioned adjacent to the word within the electronic document. The electronic dictionary may include definitions and related context information for more than one word identified by a user. The user may be defined as corresponding to a single electronic identity, an Internet Protocol address, or a screen name. The electronic dictionary may include definitions and related context information for at least one word identified by each of more than one related identity.

In another general aspect, an electronic dictionary may be operated by receiving a data request action for a word in an electronic document, accessing at least one definition of the word and context information regarding context of the word derived from within a different electronic document in which the word also appeared, and enabling a display of the definition and the context information.

Implementations may include one or more of the following features. For instance, the electronic documentation from which the context information was derived may have been previously viewed by the party submitting the data request action. Accessing the definition may include accessing the definition for more than one word. Enabling the display of the definition and the context information may include enabling the display of context information derived from more than one electronic document in which the word also appears. Context information may include one or more words appearing around the word whose definition is sought, at least one of which is adjacent to the word whose definition is sought.

Accessing the definition and context information may include accessing information stored by only a single requesting user. The electronic dictionary may include a selectable level of detail for context information to be displayed. The electronic dictionary may enable a target community to be identified for the party submitting the data request action and may select one of several definitions based on the target community identified. Implementations may include selecting among definitions based on a relationship between the target community identified and the context information.

Other implementations may include retrieving a portion of the definitions and context information from storage. Multiple words and corresponding contexts may also be retrieved from a data store. Likewise, the electronic dictionary may select from one of several definitions and instances of context information in a data store. The context information may reside on a device distinct from the device generating the data request action.

DETAILED DESCRIPTION

For illustrative purposes, FIGS. 1-5 describe an electronic dictionary capable of implementing techniques for retrieving, storing and accessing definitions and context information associated with words.

Figure 1:
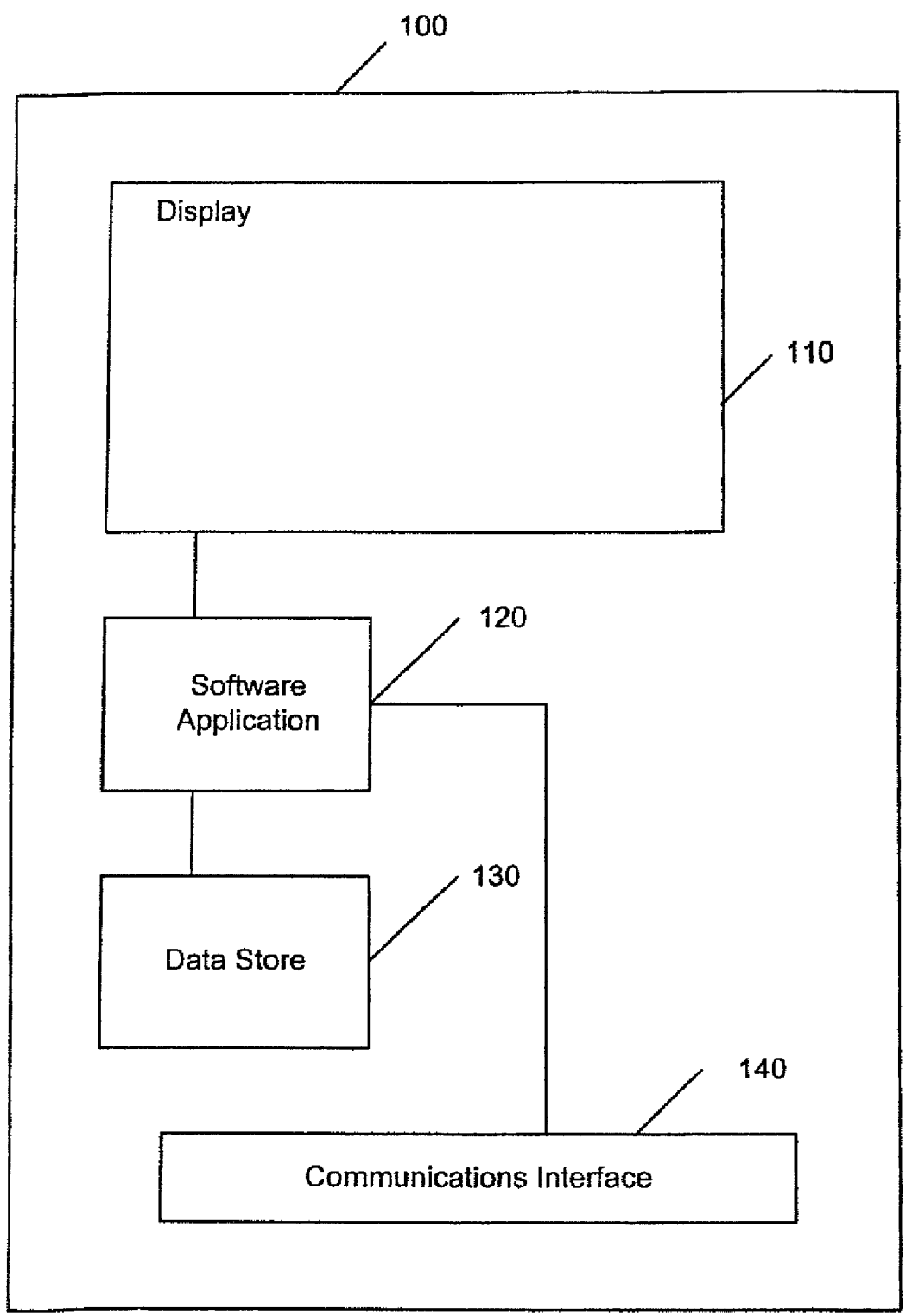
FIG. 1 is a block diagram of an exemplary electronic dictionary system capable of providing the definition and context information for a word.

Referring to FIG. 1, an electronic dictionary 100 may be structured and arranged with a display 110, one or more software applications 120, a data store 130, and a communications interface 140 that enables a user to retrieve the definition of a word and context information related to the word. As will be described in greater detail with respect to FIGS. 4 and 5, electronic dictionary 100 generally is capable of generating a data request action for a word appearing in a document, retrieving the definition and context information for the word in response to the data request action, and enabling a display of the definition and the context information for the word.

Typically, a display 110 may be structured and arranged to enable a user to view an electronic document and words appearing therein, and to display definition and context information for words of the document when a query is generated by a user. The display 110 may enable a user to view dictionary functionality across a variety of user platforms. For instance, the electronic dictionary 100 may include a variety of displays 110 on several platforms, such as a graphical user interface (GUI) residing on a general purpose computer, a liquid crystal display (LCD) like that typically found on electronic organizers (e.g., electronic books), and a personal digital assistant (PDA) screen that encompasses all or a portion of the display screen. However, the display 110 is not limited to visual displays; the display 110 also or alternatively may include audio outputs (e.g., voice synthesizers) for all or part of the user interaction.

In the display 110, data may be arranged or presented in a variety of formats. As an example, the display 110 may show only a portion of a definition. The display also may show a portion of a list of words previously sought.

Furthermore, display 110 may present more than one definition or set of context information for a word. For instance, if there is more than one definition for a word, more than one language stored for a definition, or more than one set of context information stored within the electronic dictionary 100, the requester might desire display of any or all definitions or sets of context information.

An application 120 may be structured and arranged to enable a computer user to generate a data request action, e.g., an action generated based on a word perceived from within an electronic document. The application 120 may include a program designed to run on a general purpose device or a special purpose device, such as a standalone or embedded application. For instance, the application 120 may be designed for use or integration with other applications including electronic mail programs, instant messaging programs, web browsers, and word processing programs. The application 120 typically accesses a data store 130 to which it stores and from which it retrieves definitions and context information.

A dictionary data store 130 may be structured and arranged to store definitions and context information for more than one word. The dictionary data store 130 may reside, in whole or in part, locally on the device operated by a party seeking to create, maintain and/or access the electronic dictionary system 110, or it may reside on one or more devices remote but accessible to that device.

In one example, the data could be stored on devices other than the local device or incorporated into the local device to enable faster access to the results in the future. Also, different portions of the electronic data store 130 may be distributed to devices local to the requester to enable quicker access for subsequent requests.

The dictionary data store 130 may store some or all of the words, definitions or context information on a device enabling mobile access to its information. Generally, context information includes one or more words that bring additional meaning and/or clarity to the use of a word whose definition is sought, such as additional words appearing proximate or adjacent to the word within an electronic document containing the word. For example, the word "mouse" is an example of a word having multiple meanings where the context information may be accessed to determine a precise meaning. One example can be demonstrated using the following paragraph:

A computer user may press a button on a mouse connected to the computer for one means of inputting data to a computer program. Clicking on the mouse when the pointer appears in a certain portion of the screen may activate or terminate certain computer programs.

If the computer user seeks a definition and context information for the word "mouse," numerous portions, subsets and combinations of the text above may form context information, even if that text appeared in an electronic document not being accessed when the definition is sought. In one implementation, the portion that reads "A computer user may press a button on a mouse connected to the computer for one means of inputting data to a computer program" may form the context information.

Another implementation of context information may include a subset of information like that provided above, such as one or more words appearing adjacent to the word whose definition is sought. For example, the words "mouse connected to the computer" also may form the context information for the word "mouse."

Although the previous two implementations describe examples of context information including the sentence in which the word appears and the sentence fragment beginning with the word whose definition is sought as the context information, the context information is not limited to those implementations. The context information also may be formed by various combinations of words that include words generally appearing around the word whose definition is sought that may bring clarity to the definition of the word. For example, the phrase "a computer user may press a mouse for inputting data" may form context information. Though various algorithms may intelligently create a wording different than the text as it originally appeared in the electronic documentation, this example illustrates that the context information is not limited to the exact sequence of words as they appear in the original document.

Based on this context information, the particular definition of a word may be determined. For example, it is likely that the definition of a "mouse" describing a computer input device is sought if the words "computer," "screen," "click," or "button" appear as part of the context information.

A communications interface 140 may be provided to enable access by application 120 to distributed portions of data store 130. Typically, the communications interface 140 may be structured and arranged to enable access to the electronic dictionary 100 by other applications and devices, and/or to enable the electronic dictionary 100 to interface with a network to retrieve, access or store portions of the electronic dictionary 100. Generally, as will be described relative to FIG. 3, the communications interface 140 is used to communicate data across a network between the electronic dictionary 100 and one or more dictionary data stores 130.

The communications interface 140 may include networking componentry such as a modem, a network connection including Ethernet equipment, a USB ("Universal Serial Bus") port, and/or serial or parallel port connection devices. The communication interface 140 also or alternatively may include wireless componentry, such as Bluetooth devices, 802.11 wireless devices, and HomeRF ("Home Radio Frequency") devices in addition to other wireless components. In another implementation, the electronic dictionary 100 may be structured and arranged to operate in a standalone mode independent of whether the electronic dictionary provides the capability to synchronize with other systems using devices such as those described with respect to communications interface 140.

Examples of the network accessed by the communications interface 140 typically include hardware and/or software capable of enabling direct or indirect communications between the display 100 and one or more dictionary data stores 130, as will be described with reference to FIG. 3. The network may include a direct link between the electronic dictionary display 110 and the dictionary data store 130 (e.g., in the same computing system, or directly connected), or it may include one or more networks or subnetworks between them (not shown). Each network or subnetwork may include, for example, a wired or wireless data pathway capable of carrying and receiving data. Examples of the network include the Internet, the World Wide Web, a WAN ("Wide Area Network"), a LAN ("Local Area Network"), an analog or a digital wired and wireless telephone network (e.g., PSTN ("Public Switched Telephone Network"), ISDN ("Integrated Services Digital Network"), or xDSL ("any form of Digital Subscriber Loop")), radio, television, cable, satellite, and/or any other delivery mechanism for carrying data.

Figure 2:
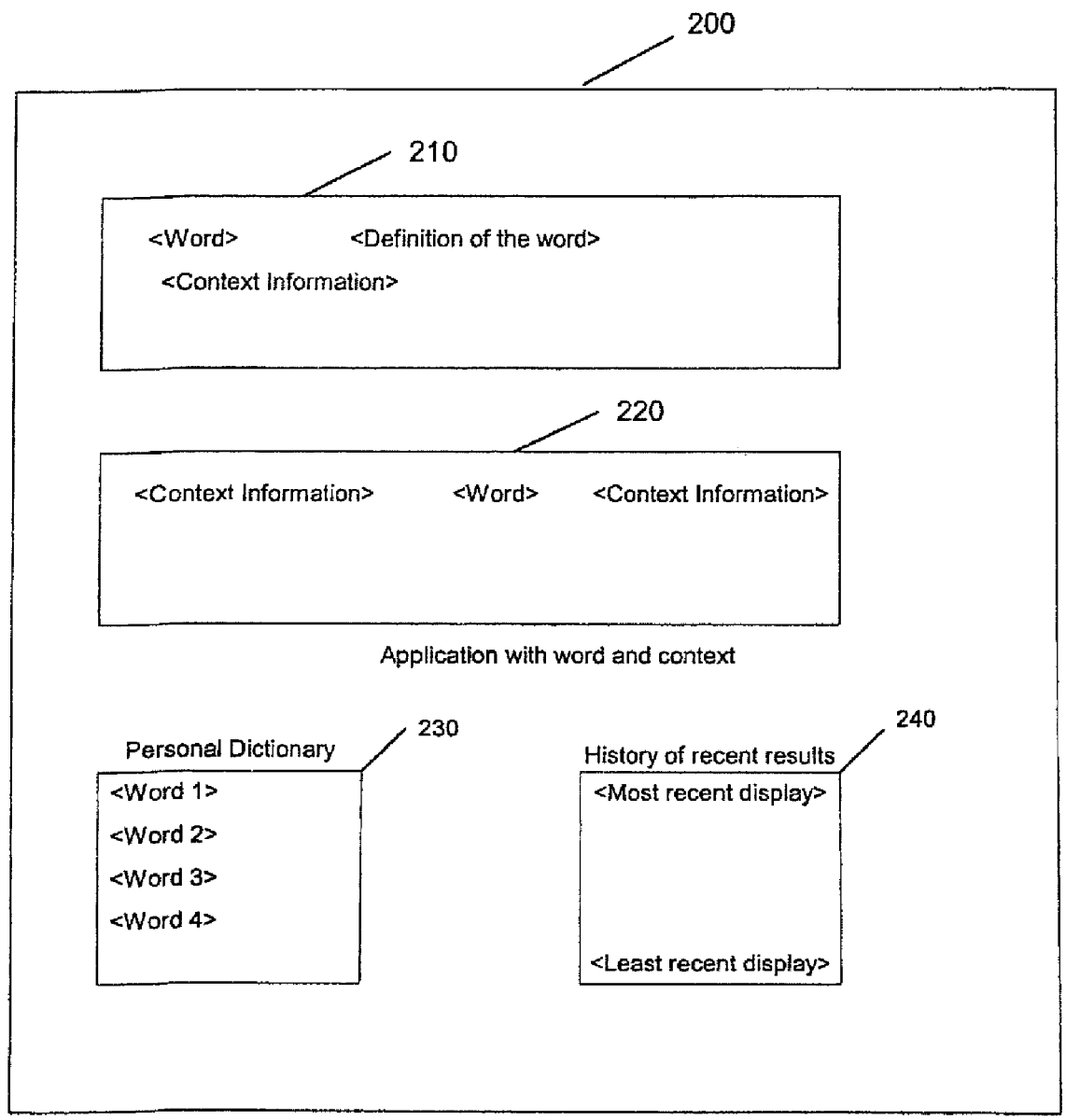
FIG. 2 is an exemplary display reflecting information generated by an electronic dictionary including at least one word, and definition and context information corresponding to that word.

FIG. 2 depicts one implementation of a display of the electronic dictionary, which is shown generally in FIG. 1. The display 200 may include one or more of a results portion 210, a context information portion 220, a personal dictionary portion 230, and a recent results portion 240. The orientation of these portions may be arranged as shown or in other ways.

The results portion 210 is structured and arranged to display the word, the definition of the word and the context information for the word.

Typically, the context information portion 220 includes one or more instances of context information for a word. As described above, this context information may have been retrieved from within an electronic document that included the word and may include words that appeared around the word in question.

The personal dictionary portion 230 may include a list of one or more other words that are included in the user's personal dictionary or that are related to the word being sought.

The recent results portion 240 may include a list of complete or abbreviated results, such as those shown in the results portion 210 and which have been generated recently.

Figure 3:
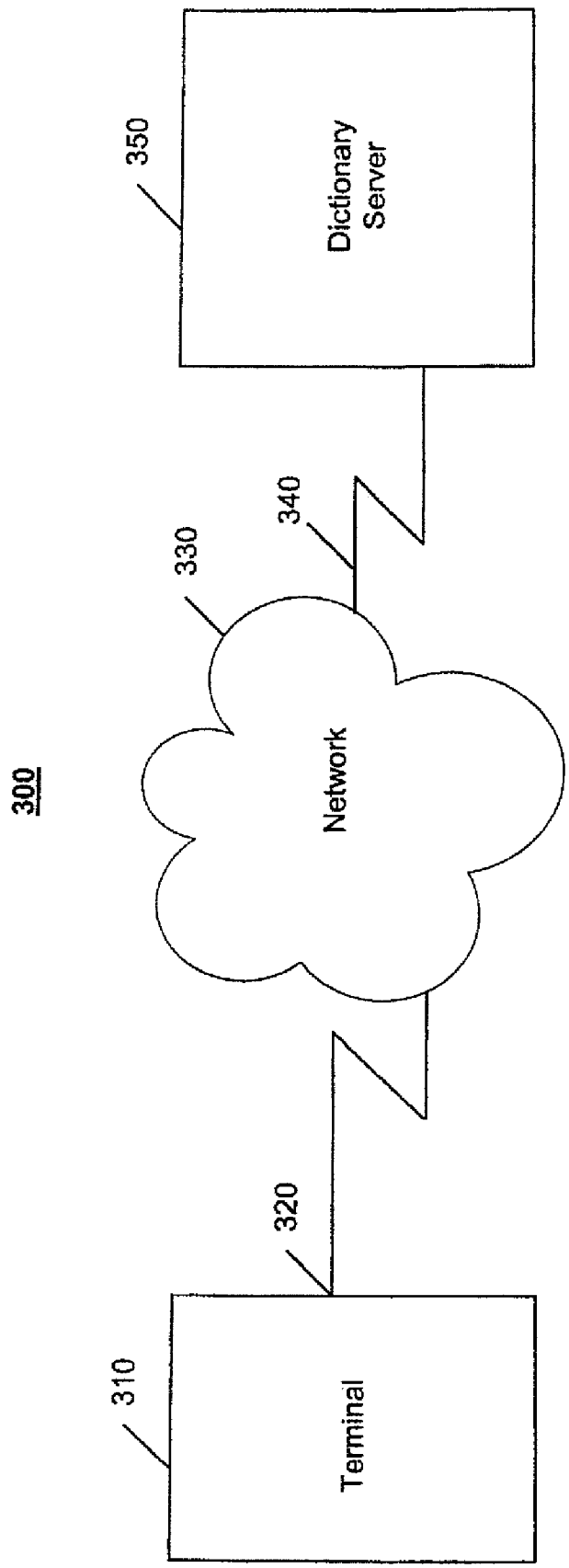
FIG. 3 is a block diagram illustrating a communications system capable of implementing and making accessible an electronic dictionary across a network.

Referring to FIG. 3, a communications system 300 is capable of implementing the electronic dictionary 100 described in FIG. 1. For brevity, several elements of FIG. 3 are represented as monolithic entities. However, as would be understood by one skilled in the art, these elements each may include numerous interconnected computers and components designed to perform a set of specified operations and/or predicated to a particular geographical region. Typically, a communications system 300 includes a terminal 310, a communications link 320, a network 330, a communications link 340 and a dictionary server 350.

The terminal 310 may include one or more devices capable of generating a data request action across a network 330 to a dictionary server 350. The terminal 310 may include a controller (not shown) that processes instructions received from or generated by a software application, a program, a piece of code, a device, a computer, a computer system, or a combination thereof, which independently or collectively direct operations of the terminal 310. The instructions may be embodied permanently or temporarily in any type of machine, component, equipment, storage medium, or propagated signal that is capable of being delivered to the terminal 310 or that may reside with the controller at terminal 310. Terminal 310 may include a general-purpose computer (e.g., a personal computer) capable of responding to and executing instructions in a defined manner, a workstation, a notebook, a PDA ("Personal Digital Assistant"), a wireless phone, a component, other equipment, or some combination of these items that is capable of responding to and executing instructions.

For instance, in one implementation, the terminal 310 includes one or more information retrieval software applications capable of receiving one or more data units, e.g., a browser, a mail application, an instant messaging client, an Internet service provider client, or an AOL TV or other integrated client. The information retrieval software applications may run on a general purpose operating system and a hardware platform that includes a general purpose processor and specialized hardware for graphics, communications and/or other capabilities. In another implementation, terminal 310 may include a wireless device, such as a telephone, running a micro-browser application on a reduced operating system and specialized hardware capable of operating in mobile environments.

The communications link 320 is used to communicate data between terminal 310 and network 330. Communications link 320 may include a telephone line, a wireless network link, a cable network, or a direct connection, for example.

The network 330 typically includes hardware and/or software capable of enabling direct or indirect communications between the terminal 310 and the dictionary server 350. The network 330 may provide a direct link between the terminal 310 and the dictionary server 350, or it may be included as a component or subnetwork used to provide a link between terminal 310 and dictionary server 350 (not explicitly shown). Each network or subnetwork may include, for example, a wired or wireless data pathway capable of carrying and receiving data. Examples of network 330 include the Internet, the World Wide Web, a WAN, a LAN, an analog or a digital wired and wireless telephone network (e.g., PSTN, an ISDN, a XDSL), and/or a radio, a television, a cable, a satellite, or any other delivery mechanism for carrying data.

The communications link 340 is used to communicate data between the network 330 and the dictionary server 350. Like communications link 320, examples of communications link 340 may include a telephone line, a wireless network link, a cable network, or a direct connection, for example. As such, communications link 340 may share one or more physical or logical devices with communications link 320.

The dictionary server 350 may include one or more devices capable of responding to a data request action generated by the terminal 310 through the network 330. The dictionary server 350 may include a controller (not shown) that processes instructions received from or generated by a software application, a program, a piece of code, a device, a computer, a computer system, or a combination thereof, which independently or collectively direct operations of the dictionary server 350. The instructions may be embodied permanently or temporarily in any type of machine, component, equipment, storage medium, or propagated signal that is capable of being delivered to the dictionary server 350 or that may reside with the controller at dictionary server 350. Dictionary server 350 may include a general-purpose computer (e.g., a personal computer) capable of responding to and executing instructions in a defined manner, a workstation, other equipment, or some combination of these items that is capable of responding to and executing instructions.

For instance, in one implementation, the dictionary server 350 includes one or more information-serving software applications capable of responding to a data request action, e.g., a web server, a mail server application, an instant messaging (IM) server, an Internet service provider server, or an AOL TV or other integrated server. The information-serving software applications typically are run by a general purpose operating system and a hardware platform that includes a general purpose processor and specialized hardware for graphics, communications and/or other capabilities.

Figure 4:
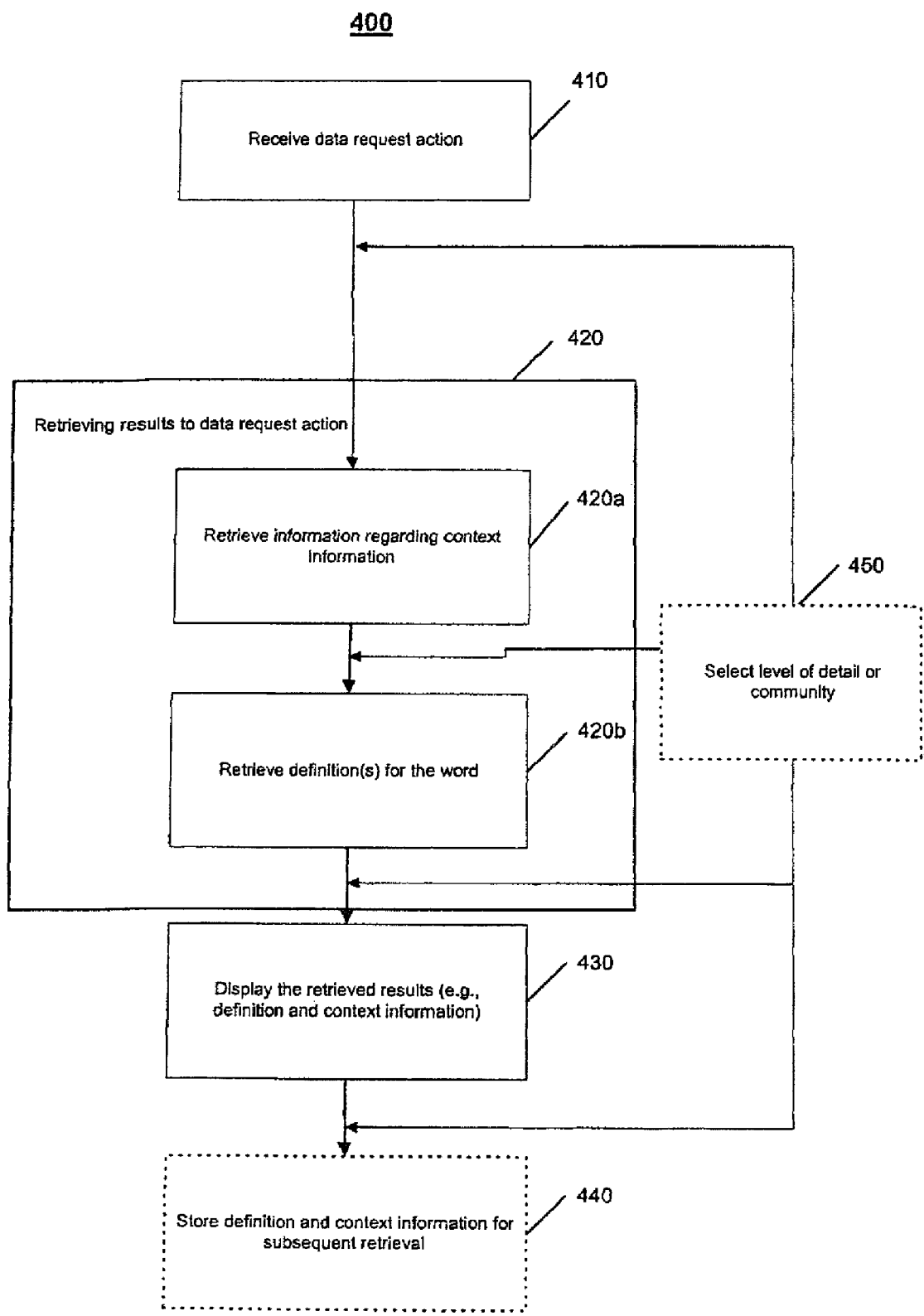
FIG. 4 is a flow chart illustrating a method used to retrieve definition and context information for a word using an electronic dictionary, such as that shown in FIG. 1.

FIG. 4 illustrates a procedure 400 for accessing information from within an electronic dictionary 100 having context information, such as the various electronic dictionaries described with reference to FIGS. 1-3. Typically, accessing information from an electronic dictionary 100 includes receiving a data request action for a word (step 410), retrieving results for the data request action (step 420), displaying the definition and context information (step 430), and storing the definition and context information for subsequent retrieval (step 440).

Initially, the electronic dictionary receives a data request action (step 410). A data request action generally includes an identification of one or more words for which a definition is sought, e.g., by a viewer of an electronic document. A data request action may be generated through the highlighting of a word in an electronic document using, e.g., an application 120. Alternatively, for example, the user may type the word into an electronic dictionary application. In another example, the user may use an electronic or virtual pointing device to select a word from within an electronic document, and thus generate the data request action.

Receiving a data request action may include receiving a data request action from a specialized device. For example, a user on a mobile device (e.g., an Internet-enabled wireless phone or PDA ("Personal Digital Assistant")) may access a dictionary data store 130 with information modified for display to a lower bandwidth and/or to a limited display size.

In response to the data request action, the electronic dictionary 100 retrieves the results for the data request action (step 420). Retrieving the results may include accessing a personal electronic dictionary with previously-accessed information. For example, prior to checking other dictionary data stores 130, a user accessing a dictionary data store 130 may check a personalized dictionary data store for previously accessed definitions, context information and notes taken. Furthermore, retrieving the results may include retrieving results from a community dictionary data store 130. For example, a family may customize a family dictionary to enable access to all family members. Retrieving the results (step 420) generally includes retrieving information regarding context information (step 420*a*) and retrieving definition(s) for the word (step 420*b*).

Retrieving the context information (step 420*a*) includes retrieving portions of other electronic documents that were previously identified and stored as context information in response to previous data request actions or otherwise, for example, as was described earlier with respect to FIG. 1. Implementations may include retrieving several contexts for a given word. For example, an electronic instruction manual may contain several references to a specified term. If the word referring to the specified term is used in the data request action, subsequently retrieving the context information may include retrieving the multiple references to the context information referring to the specified term.

In response to the data request action, the electronic dictionary 100 also or alternatively may retrieve the definition of the word from a dictionary data store (step 420*b*). For instance, retrieving the results may include accessing a dictionary server 350 from across a network 330, as described with reference to FIG. 3. In another implementation, the electronic dictionary 100 may access a local dictionary data store 130 residing on a local client device 310 (e.g., a personal computer) while also accessing a dictionary server 350. Retrieving the definition of the word also may include conducting an initial search of a local data store before conducting a subsequent search of a network or remote data store, which subsequent search may be performed based on whether results are found locally.

Retrieving definitions may include using the context information to select an appropriate definition for a word. For example, a word may have multiple meanings but, based on the context information, the electronic dictionary 100 may determine that one or more of the definitions are more appropriate for the context. More specifically, if definitions for the word are associated with particular context information for that word within the electronic dictionary, the context information for the word may be matched against stored context information and used to identify an appropriate definition when a request is received.

Although some benefits stem from retrieving context information (step 420*a*) before retrieving the definition of the word (step 420*b*), such as using context information for a more accurate definition, implementations may perform both steps simultaneously or sequentially in reverse order.

After retrieving the definition of the word and the context information (step 420), the electronic dictionary displays the retrieved results (e.g., the definitions of the word and/or the context information) (step 430). Displaying the definition of the word and the context information also may include displaying a list of words the user has viewed (as depicted by the personal dictionary 230 in FIG. 2), and/or a list of the most recent results (as depicted by the history of recent results 240 in FIG. 2).

With the retrieved results, the electronic dictionary 100 may store the definition and/or the context information (step 440) as a personalized electronic dictionary. Thus, as a user retrieves more words, the personalized dictionary grows. Implementations may include storing the definition of the word and the context information in a data store 130. For example, a user may wish to retain subsequent access to the definitions that have been retrieved in their research. As will be discussed further with respect to FIG. 5, storing the definition and context may include storing the electronic dictionary 100 in a distributed manner, as is depicted in FIG. 3.

As an optional step, the electronic dictionary 100 may select a level of detail or a target community (step 450). For example, the computer user may select a low level of detail that provides a very cursory definition. By contrast, the user may desire, select and obtain an exhaustive definition. The electronic dictionary 100 may include a selectable level of detail for both the definition of the word and the context information. Implementations may include selecting a target community for retrieval. For example, a medical professional may wish to retrieve definitions and context information from electronic dictionaries designed to serve the medical community. The target community may be automatically selected based on the identity characteristics, or user activity, of the party seeking a definition. In other implementations, the party may express certain interests in either creating the electronic dictionary 100 or as part of previously creating a user profile that may include such characteristics and/or detail or community settings.

Implementations of determining identification may include using an IP ("Internet Protocol") address, or an online identification (e.g., screen name). Implementations also may include having the OSP ("Online Service Provider") analyze the nature of the words sought and/or characterize these searches to create a profile. For example, when a user frequently searches for terms related to marine biology, an interest in marine biology may be inferred and used to tailor searches to retrieve results from a marine biology dictionary.

Selecting the level of detail (step 450) may occur at several stages in the sequence of steps. In one example, the electronic dictionary 100 may select a definition with a low level of detail as it is retrieved from the dictionary in conjunction with step 420*b*. In another example, the electronic dictionary 100 may retrieve definitions with several levels of detail and select from one of them before displaying the definitions of the word in conjunction with step 430.

Similarly, with respect to context information, the electronic dictionary 100 may select various levels of context information at various stages. For example, the electronic dictionary 100 may retrieve a small number of words for context information for a small level of detail in conjunction with step 420*a*. In another example, the electronic dictionary 100 may retrieve a large set of words for context information as part of step 420*a*, but display a small number of words in conjunction with step 430 when there is a low level of detail.

Figure 5:
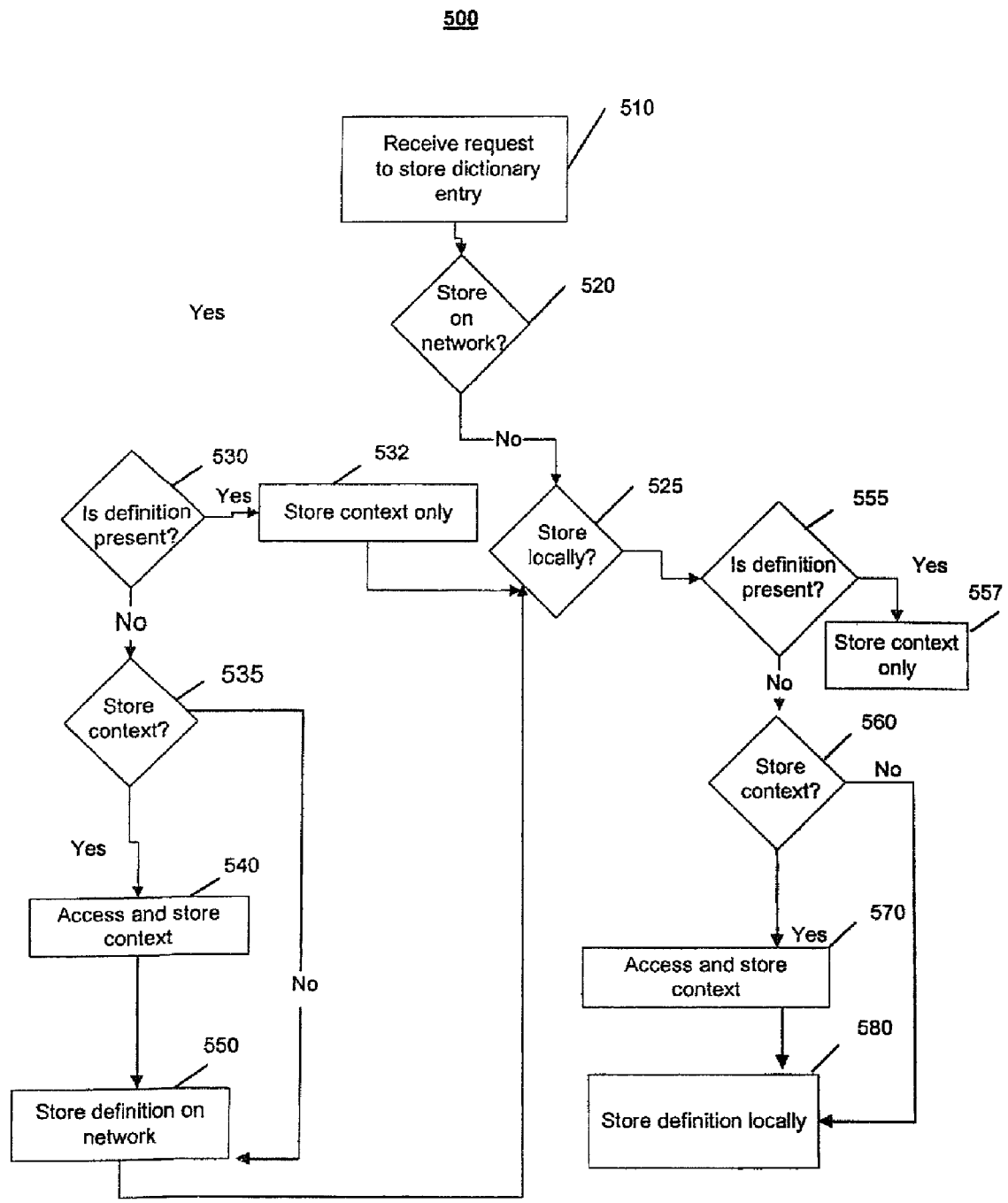
FIG. 5 is a flow chart illustrating a method used to access and store definition and context information for words within an electronic dictionary, such as that shown in FIG. 1.

FIG. 5 illustrates one example of a procedure 500 for storing the definitions and/or context, as described in step 440 in FIG. 4. Though the procedure for storing the definition and context information makes reference to the electronic dictionary 100, implementations also are applicable to the electronic dictionaries described with reference to FIGS. 2-3.

Typically, a user will store a definition of a word in a personal dictionary retrieved from an available dictionary that enables a user to retrieve words. For example, an OSP may enable subscribers to access a network-based server that provides definitions of words. Implementations may include enabling a user to specify one or more inputs when the definition is retrieved. For example, a user may elect to specify an exhaustive definition of a word, in contrast to a brief definition of a word.

Initially, the electronic dictionary 100 receives a request to store the dictionary entry (step 510). Implementations may include having the user request to store the definition and context information. For example, a computer user may generate a computer instruction to save the returned results along with notes taken by the user. Implementations also may include having the electronic dictionary 100 automatically save retrieved results to a dictionary data store 130.

After receiving the request to store the information, the electronic dictionary decides whether to store retrieved results on a network (step 520), such as the dictionary server 350 in FIG. 3. In one implementation, the electronic dictionary may store the information for subsequent access from mobile devices (not shown). Storing the information for mobile access may include storing modified versions of the information. For example, the electronic dictionary 100 may modify the information to be stored to reduce the size required for storage and/or to change the formatting for display on a mobile device.

When deciding whether to store the electronic dictionary on a network (step 520), the electronic dictionary 100 examines whether the definition is already stored on the network (step 530). If so, the electronic dictionary 100 may store only the context information (step 532) or it may supplement the definition as appropriate.

If the definition is not present, the electronic dictionary 100 decides whether to store the context information (step 535). If so, the electronic dictionary 100 accesses and stores the context information (step 540). Accessing the context information generally corresponds to accessing the context information acquired as part of responding to the data request action described in step 420*a* in FIG. 4. However, accessing and storing the context information is not limited to storing the exact context information retrieved in step 420*a*. For example, the user may add notes to the context information.

Whether or not the electronic dictionary 100 stores the context information on the network, the electronic dictionary 100 may store the definition of the word on the network (step 550). Storing the definition of the word is not limited to the definition retrieved in step 420*b* in FIG. 4. For example, the user may modify the definition of the word before the definition is stored.

Independent of whether the user stores the definition and context information on the network, the electronic dictionary 100 determines whether to store retrieved results locally (step 525). If the electronic dictionary 100 intends to store the context information locally, the electronic dictionary 100 examines if the definition is already stored locally (step 555). If so, the electronic dictionary stores the context information (step 557).

If the definition is not stored locally, the electronic dictionary 100 determines whether to store the context information locally (step 560). If so, the electronic dictionary 100 accesses and stores the context information (step 570). Regardless of whether context information is stored, the electronic dictionary 100 stores the definition of the word locally (step 580). As described above with respect to storing the definition and context information on a network, the definitions and context information stored locally are not limited to the retrieved results for the data request action. Implementations may include modifying the definitions and the context information before storing the information locally.

Although FIG. 5 depicts storing the information on the network first before storing information locally, implementations are not limited to that order of storing information. For example, the electronic dictionary 100 may first store information locally and subsequently store information on a network. Other implementations may include storing the definitions and the context information both locally and on a network. For example, an electronic dictionary may store the definition and context information locally and also may store the same information on a network. Another example may include storing the definitions on a network and the context information locally. Examples also may include storing the most frequently accessed definitions and context information locally and storing the remaining definitions and context information on the network.

The electronic dictionary may include an auto-update feature. For instance, a user may specify that the electronic dictionary generate an indication that a word of key interest has been updated. In one example, a user might be researching cancer treatments and may wish to receive all new information. This indication may include an email, an instant message, a web display, a pop-up message or another application informing the user about the update. In some examples, the indication may contain the update, the update and the older results, a link to the results, or other information.

The electronic dictionary also may provide additional information related to the subject mater. For instance, the results may reference a related website, a related TV program or other material. Some examples may enable the requestor to retrieve the other material. For instance, a web application could be launched, a video stream could be received, a TV channel changed, and/or a recorder programmed.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims.

What is claimed is:

1. A computer-implemented method for providing a computer user with information related to a word in electronic content, the method comprising:
    receiving a first request for information corresponding to a word appearing in electronic content being rendered to a party submitting the first request when the first request is submitted,
    deriving context information for the word based on the electronic content being rendered to the party when the first request is submitted;
    storing the context information in association with the word;
    receiving a second request, at a time subsequent to the first request, for information corresponding to the word;
    in response to receiving the second request, accessing, from electronic storage, the context information stored in association with the word and derived based on the electronic content rendered during the first request; and
    enabling presentation, to a party submitting the second request, of the accessed context information derived based on the electronic content rendered during the first request along with information corresponding to the word.

2. The computer-implemented method of claim 1 wherein receiving the first request and receiving the second request includes receiving the first request and the second request from a single party.

3. The computer-implemented method of claim 2 wherein storing the context information includes storing the context information in association with an identifier for the single party.

4. The computer-implemented method of claim 2 further comprising:
    identifying a target community associated with the single party; and
    based on the identified target community, selecting the information corresponding to the word from among multiple information options.

5. The computer-implemented method of claim 4 wherein identifying the target community includes determining the target community based on identification information for the single party.

6. The computer-implemented method of claim 5 further comprising determining the identification information based on an Internet Protocol address, screen name, or a user profile of the single party.

7. The computer-implemented method of claim 2 further comprising:
    analyzing requests of the single party to create a profile; and
    using the profile to identify information results that are responsive to a predicted interest of the single party.

8. The computer-implemented method of claim 1 wherein storing the context information includes storing a first set of context information for the word based on a first electronic content being rendered to a first party and storing the context information further includes storing a second and different set of context information for the word based on the first or a second electronic content being rendered to a second party.

9. The computer-implemented method of claim 1 further comprising:
    determining that the context information is responsive to a predicted interest of one or more online identities of the party submitting the first request; and
    enabling the online identities to access the context information.

10. The computer-implemented method of claim 1 wherein receiving the first request includes receiving a data request from a web browser that is transmitted to a web server.

11. The computer-implemented method of claim 1 wherein enabling presentation includes presenting, to the party submitting the second request, the accessed context information derived based on the electronic content rendered during the first request along with information corresponding to the word.

12. The computer-implemented method of claim 1 wherein enabling presentation includes providing, to a terminal, the accessed context information derived based on the electronic content rendered during the first request along with information corresponding to the word to enable the terminal to present the accessed context information derived based on the electronic content rendered during the first request along with information corresponding to the word.

13. The computer-implemented method of claim 1 wherein:
    receiving the first request and receiving the second request includes receiving a first request for a definition of a word and receiving a second request for the definition of the word; and
    enabling presentation, to the party submitting the second request, of the accessed context information derived based on the electronic content rendered during the first request along with information corresponding to the word includes enabling presentation, to the party submitting the second request, of the accessed context information derived based on the electronic content rendered during the first request along with the definition of the word.

14. A computer-readable storage medium storing instructions that, when executed by a processor, perform operation comprising:
receiving a first request for information corresponding to a word appearing in electronic content being rendered to a party submitting the first request when the first request is submitted,
deriving context information for the word based on the electronic content being rendered to the party when the first request is submitted;
storing the context information in association with the word;
receiving a second request, at a time subsequent to the first request, for information corresponding to the word;
in response to receiving the second request, accessing, from electronic storage, the context information stored in association with the word and derived based on the electronic content rendered during the first request; and
enabling presentation, to a party submitting the second request, of the accessed context information derived based on the electronic content rendered during the first request along with information corresponding to the word.

15. The computer-readable storage medium of claim 14 wherein:
receiving the first request and receiving the second request includes receiving the first request and the second request from a single party; and
storing the context information includes storing the context information in association with an identifier for the single party.

16. The computer-readable storage medium of claim 14 wherein receiving the first request and receiving the second request includes receiving the first request and the second request from a single party, further comprising:
identifying a target community associated with the single party; and
based on the identified target community, selecting the information corresponding to the word from among multiple information options.

17. The computer-readable storage medium of claim 14 wherein receiving the first request and receiving the second request includes receiving the first request and the second request from a single party, further comprising:
analyzing requests of the single party to create a profile; and
using the profile to identify information results that are responsive to a predicted interest of the single party.

18. The computer-readable storage medium of claim 14 wherein storing the context information includes storing a first set of context information for the word based on a first electronic content being rendered to a first party and storing the context information further includes storing a second and different set of context information for the word based on the first or a second electronic content being rendered to a second party.

19. The computer-readable storage medium of claim 14 wherein:
receiving the first request and receiving the second request includes receiving a first request for a definition of a word and receiving a second request for the definition of the word; and
enabling presentation, to the party submitting the second request, of the accessed context information derived based on the electronic content rendered during the first request along with information corresponding to the word includes enabling presentation, to the party submitting the second request, of the accessed context information derived based on the electronic content rendered during the first request along with the definition of the word.

20. A computer system comprising:
means for receiving a first request for information corresponding to a word appearing in electronic content being rendered to a party submitting the first request when the first request is submitted,
means for deriving context information for the word based on the electronic content being rendered to the party when the first request is submitted;
means for storing the context information in association with the word;
means for receiving a second request, at a time subsequent to the first request, for information corresponding to the word;
means for, in response to receiving the second request, accessing, from electronic storage, the context information stored in association with the word and derived based on the electronic content rendered during the first request; and
means for enabling presentation, to a party submitting the second request, of the accessed context information derived based on the electronic content rendered during the first request along with information corresponding to the word.

* * * * *